Aug. 29, 1961     P. FORMAN     2,998,481
RADAR TARGET POSITION PLOTTING APPARATUS
Filed April 27, 1953
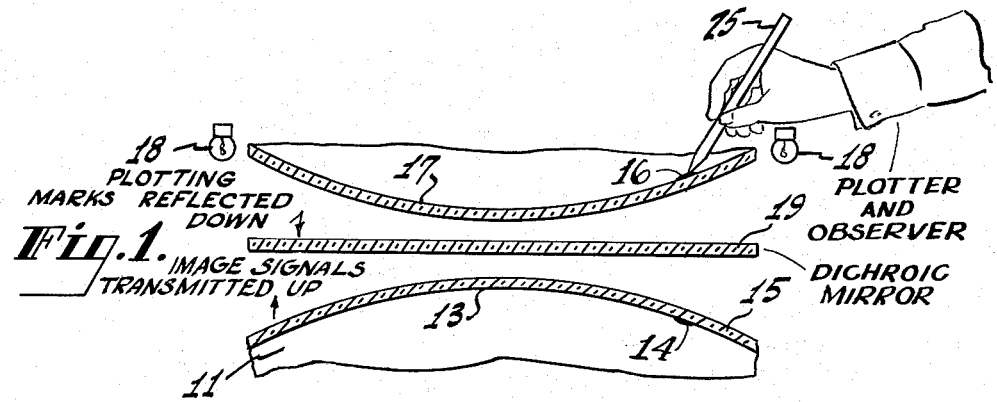
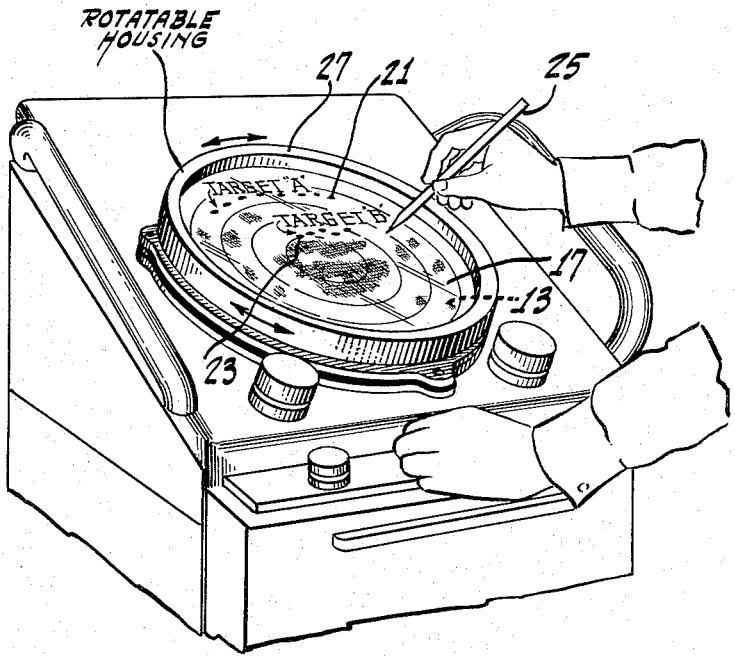
INVENTOR.
PHILIP FORMAN
BY *J. L. Whittaker*
ATTORNEY

2,998,481
RADAR TARGET POSITION PLOTTING APPARATUS

Philip Forman, Brooklyn, N.Y., assignor to Radio Corporation of America, a corporation of Delaware
Filed Apr. 27, 1953, Ser. No. 351,150
6 Claims. (Cl. 178—7.84)

This invention relates generally to pictorial radar displays and particularly relates to improved apparatus, including a chromatic or "dichroic" mirror, for plotting navigational information and the positions of radar targets which are displayed on an illuminated image screen.

Previously known systems and apparatus for establishing plots of the positions of radar targets appearing in cathode ray tube displays have not always proved entirely satisfactory. Some of these systems utilize an edge-lighted concave plotting surface which is complementarily curved with respect to the curvature of the cathode ray tube image screen. In other words, the curvature of the plotting surface is equal to but opposite to the curvature of the face plate (and image screen) of the display tube. A semi-transparent plane mirror of the half-silvered type has been interposed between the image screen and the plotting surface. With the foregoing arrangement plotting marks or other indicia applied to the curved plotting surface appear to lie in the surface of the display tube screen.

The performance of such apparatus often is marginal and leaves much to be desired. The radar image light transmissivity of the achromatic mirror utilized therein is relatively low, approximately fifty percent. The reflectivity of the plotting marks also is quite low, from ten to twenty percent. These poor transmission and reflection characteristics result in the presentation of a rather weak visual image display in which there is poor target image and plotting mark contrast. Also, the prior art apparatus is not advantageous in that undesirable multiple spurious images are produced for each plotting mark introduced into the visual display and for each target image appearing therein.

An object of the present invention is to provide improved apparatus for plotting the positions of radar target images appearing in a cathode ray tube display.

Another object of the invention is to provide apparatus of the above type in which the number of spurious images normally appearing in a cathode ray display is considerably reduced.

Another object of the invention is to provide radar target position plotting apparatus in which a visual image presentation is afforded having improved image contrast.

A further object of the invention is to provide improved radar target position plotting apparatus in which a more efficient light ray transmission and reflection medium is employed.

A further object of the invention is to provide improved radar target position plotting apparatus in which the plotting surface is rotatable with respect to the image display tube and provides a relative plot of the positions of radar targets.

A still further object is to provide a composite navigational and radar display wherein the display includes color contrast.

The foregoing and other objects and advantages may be achieved in accordance with the invention by utilizing a chromatic or "dichroic" medium to selectively transmit and reflect plotting marks and target images. The radar target images are transmitted from the pictorial radar display through the dichroic medium to the viewer, and plotting marks are reflected from the plotting surface so that they appear in the radar display. The light ray transmission and reflection efficiencies in the chromatic medium are quite high, of the order of ninety percent, and a bright visual presentation is afforded. The contrast between plotting marks and target images is thereby considerably enhanced. Also the use of a chromatic medium rather than an achromatic medium reduces the number of spurious images produced and affords an improved pictorial display.

The invention will be described in greater detail with reference to the accompanying drawing in which:

FIGURE 1 is a cross-sectional view of apparatus for plotting the positions of radar targets, according to the invention; and FIGURE 2 is a view in perspective of equipment embodying the apparatus of FIGURE 1.

Similar reference characters are applied to similar elements throughout the drawing.

Referring to FIGURE 1, a cathode ray tube portion 11 is shown having an image screen 13. The screen 13 may be either a projection or fluorescent type screen. For purposes of the present example the screen 13 is illustrated as the latter type which fluoresces under electron bombardment. Spaced from the screen 13, which is deposited on the inner surface of the tube face plate 15, is a transparent plotting member 17 which preferably comprises a tempered highly polished glass plate having a configuration which is the mirror image of the configuration of the image screen 13. The curvature at each point of the transparent plotting member 17 is approximately equal and opposite to the curvature at the corresponding opposing point of the image screen 13. The "complementary" curvature of screen 13 and member 17 affords the advantage of reducing parallax error. This parallax error is the apparent angular shift in position of a radar image signal displayed on screen 13 as viewed through the transparent plotting member at different observation angles. Lamps 18 are located near the edge of the plotting member 17 for edge-lighting and internally illuminating the plotting member. The lamp brilliance preferably is variable and may be controlled by any convenient means such as a rheostat (not shown).

Interposed between the image screen 13 of the tube 11 and the transparent plotting member 17 is a plane chromatic mirror 19 of the dichroic or two-color type. The dichroic mirror 13 is capable of transmitting a selected portion of the light spectrum through the dichroic medium and is capable of reflecting other portions of the light spectrum. The dichroic mirror utilized herein may be of any convenient design which has high efficiency of transmission and reflection of selected portions of the light ray spectrum. The mirror used in the instant example is one which reflects red light and transmits blue and green (yellow) light. The mirror comprises a glass plate coated with a multi-layer film. The film design comprises, for example, seven layers of zinc sulfide and thorium oxi-fluoride. There are four layers of zinc sulfide each one-half wavelength thick at 4700 Angstroms separated by three layers of thorium oxi-fluoride each one-quarter wavelength thick at 4700 Angstroms. The film deposition was controlled by observance at a 45° angle of incidence through a filter peaked at 4700 Angstroms.

The operation of the above apparatus for tracking the positions of radar targets will be described with reference to FIGURES 1 and 2. A number of radar targets appear in the plan-position-indication (P.P.I.) display of FIGURE 2. It will be assumed that images 21 and 23 appearing in the display correspond to moving radar targets selected for tracking purposes. These radar targets 21 and 23 will be referred to as targets A and B respectively.

Blue and green (yellow) light rays 14 corresponding to the selected targets (A and B) and other radar targets pass upwardly from the fluorescent screen 13 through the dichroic mirror 19 to the observer's eye. The efficiency of yellow light transmission is of the order of 90 percent. The point of a wax or "china marking" type pencil 25 is then placed in contact with the portion of the plotting surface 17 corresponding to the position of the selected target in the P.P.I. display and a suitable mark 16 or symbol is made thereon. The natural color of the wax marks from the pencil 25 appear on the edge lighted plotting member 17. However, the dichroic mirror 19 reflects approximately 90 percent of the red light resulting from the pencil markings into the plane of the P.P.I. display. Substantially all other colors are rejected. Since the dichroic mirror light transmission and reflection of yellow and red light, respectively, is of the order of ninety percent, a bright pictorial display is provided in which the red-yellow color contrast is excellent. The observer of the display views the raw radar data in yellow color and the plotting marks in red color. During each succeeding sector or complete 360° radar search operation further wax marks are placed on the plotting member 17 to record the successive new positions of targets A and B. Over a period of time "histories" of the positions of the selected moving targets are provided. These histories may be analysed so that the courses and speeds of the tracked targets may be determined, passing distances may be computed, and other navigational problems solved. After the plot or plots have served their useful purpose, the old plots readily may be erased with a soft cloth such as cheesecloth and a suitable wax solvent, and new plots may be initiated.

The edge lights 18 referred to in the description of the apparatus of FIGURE 1 may be contained within a housing 27 (shown in FIG. 2) which serves to support the curved glass plotting medium 17. The housing 27 may be locked in position over the face of the tube portion 11, if desired, or may be azimuthally rotatable with respect to the image display. The rotatable plotting board feature may be especially desirable since even though the ship carrying the instant apparatus changes its course, the plot previously obtained may be used in connection with the new plot to illustrate the relative courses pursued by the ships.

When insufficient time is available to erase an old plot and only the raw radar data (in yellow color) is to be viewed, the edge lights 18 may be turned off and the red plotting marks caused to disappear from the display.

The instant apparatus thus affords an improved radar display in which there is high selective transmission and reflection of cathode ray radar target images and plotting marks, respectively. The use of a chromatic rather than an achromatic medium reduces the number of spurious images heretofore present in prior art apparatus performing analogous functions. The radar plots derived may be erased rapidly and new plots begun. If sufficient time is not available for erasure, the edge lights illuminating the interior of the plotting medium may be turned off and the P.P.I. display may be used conventionally.

What is claimed is:

1. Apparatus for plotting the positions of radar targets comprising, an image screen for displaying light images representative of the positions of said radar targets, a transparent plotting member for receiving plotting marks spaced from said image screen and having a configuration which is the mirror image of the configuration of said image screen, and a dichroic mirror interposed between said image screen and said plotting member for transmitting a selected portion of the light ray spectrum of said light images to said plotting member and for reflecting toward said plotting member the portion of the light ray spectrum of said plotting marks which is complementary to said transmitted portion, said dichroic mirror being spaced from both said image screen and said plotting member.

2. Apparatus for plotting the positions of radar targets comprising, a cathode ray tube having a curved fluorescent screen for displaying light images representative of the positions of said radar targets, a curved transparent plotting member for receiving plotting marks spaced from said fluorescent screen, the curvature at each point of said plotting member being approximately equal and opposite to the curvature at the corresponding opposing point of said fluorescent screen, and a dichroic mirror interposed between said fluorescent screen and said plotting member for transmitting a selected portion of the light ray spectrum of said light images to said plotting member and for reflecting toward said plotting member the portion of the light ray spectrum of said plotting marks which is complementary to said transmitted portion, said dichroic mirror being spaced from both said fluorescent screen and said plotting member.

3. Apparatus as claimed in claim 2 including means for rotating said plotting member with respect to said fluorescent screen.

4. Apparatus as claimed in claim 1 including means for internally illuminating said plotting member from an edge of said member.

5. Apparatus for plotting the positions of radar targets comprising, a cathode ray tube having a curved fluorescent screen for displaying light images representative of the positions of said radar targets, a curved transparent plotting member for receiving plotting marks spaced over and from the surface of said curved screen, the curvature at each point of said plotting member being approximately equal and opposite to the curvature at the corresponding opposing point of said curved screen, and a dichroic mirror interposed between said screen and said plotting member capable of transmitting a selected portion of the light ray spectrum of said image signals appearing on said fluorescent screen through said mirror with an efficiency of the order of 90 percent and capable of reflecting said plotting marks as another portion of the light ray spectrum with a like efficiency.

6. Apparatus as claimed in claim 5 including means for internally illuminating said plotting member from an edge of said member.

References Cited in the file of this patent

UNITED STATES PATENTS

| | | |
|---|---|---|
| 2,251,984 | Cleaver et al. | Aug. 12, 1941 |
| 2,392,978 | Dimmick | Jan. 14, 1946 |
| 2,403,685 | Sachtleben et al. | July 9, 1946 |
| 2,422,954 | Dimmick | June 24, 1947 |
| 2,476,619 | Nicoll | July 19, 1949 |
| 2,552,184 | Koch | May 8, 1951 |
| 2,580,240 | Newman | Dec. 25, 1951 |
| 2,588,035 | O'Neil | Mar. 4, 1952 |
| 2,590,240 | Epstein | Mar. 25, 1952 |